United States Patent
Miyazaki et al.

(10) Patent No.: US 8,171,824 B2
(45) Date of Patent: May 8, 2012

(54) VEHICULAR POWER TRANSMISSION CONTROL APPARATUS

(75) Inventors: Takeshige Miyazaki, Chiryu (JP); Hiroki Hatori, Nishio (JP)

(73) Assignee: AISIN AI Co., Ltd., Nishio-Shi (JP)

( * ) Notice: Subject to any disclaimer, the term of this patent is extended or adjusted under 35 U.S.C. 154(b) by 244 days.

(21) Appl. No.: 12/720,956

(22) Filed: Mar. 10, 2010

(65) Prior Publication Data
US 2010/0234172 A1 Sep. 16, 2010

(30) Foreign Application Priority Data

Mar. 11, 2009 (JP) .................. 2009-57491

(51) Int. Cl.
*F16H 37/06* (2006.01)
(52) U.S. Cl. ........................................ 74/661
(58) Field of Classification Search ............ 74/661; 477/5; 475/5
See application file for complete search history.

(56) References Cited

U.S. PATENT DOCUMENTS 7,093,517 B2 * 8/2006 Hanyu et al. .................. 74/661

FOREIGN PATENT DOCUMENTS

JP 2000-224710 A1 8/2000

OTHER PUBLICATIONS

U.S. Appl. No. 12/720,940, filed Mar. 10, 2010, Tanba et al.
U.S. Appl. No. 12/720,964, filed Mar. 10, 2010, Miyazaki et al.
U.S. Appl. No. 12/720,979, filed Mar. 10, 2010, Miyazaki et al.
U.S. Appl. No. 12/720,984, filed Mar. 10, 2010, Miyazaki et al.
U.S. Appl. No. 12/754,931, filed Apr. 6, 2010, Tanba et al.
U.S. Appl. No. 12/754,946, filed Apr. 6, 2010, Hatori et al.

* cited by examiner

*Primary Examiner* — Dirk Wright
(74) *Attorney, Agent, or Firm* — Burr & Brown (57) ABSTRACT

An apparatus comprises a changeover mechanism which is able to change a connection state to any one of three states, i.e., "an IN-Connection State" in which a power transmission path is provided between a transmission input shaft and the electric motor output shaft, "an OUT-Connection State" in which a power transmission path is provided between a transmission output shaft and the electric motor output shaft, and "a neutral connection state" in which no transmission path therebetween is provided. At a timing (time t1) at which a both-neutral-state is required during the vehicle is running, both "an operation for a changeover of the state-of-connecting of the clutch mechanism (C/T 30) from a connection-state to a shut-off-state" and "an operation for a changeover of said connection state of the changeover mechanism 50 from either one of the IN-Connection State and the OUT-Connection State to the non-connection state" are simultaneously started.

5 Claims, 5 Drawing Sheets

FIG. 1

IN-Connection

OUT-Connection non-connection

VEHICULAR POWER TRANSMISSION CONTROL APPARATUS

BACKGROUND OF THE INVENTION

1. Field of the Invention

The present invention relates to a vehicular power transmission control apparatus, especially to a vehicular power transmission control apparatus applied to a vehicle comprising an internal combustion engine and an electric motor as power sources.

2. Description of the Related Art

In these days, a so-called hybrid vehicle comprising an internal combustion engine and an electric motor (electric motor generator) as power sources has been developed (refer to, for example, Japanese Unexamined Patent Application Publication No. 2000-224710). In the hybrid vehicle, the electric motor is used as the power source generating a driving torque for driving the vehicle together with the internal combustion engine or by itself, or is used as a power source for starting the internal combustion engine.

Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

SUMMARY OF THE INVENTION

Figure 4:
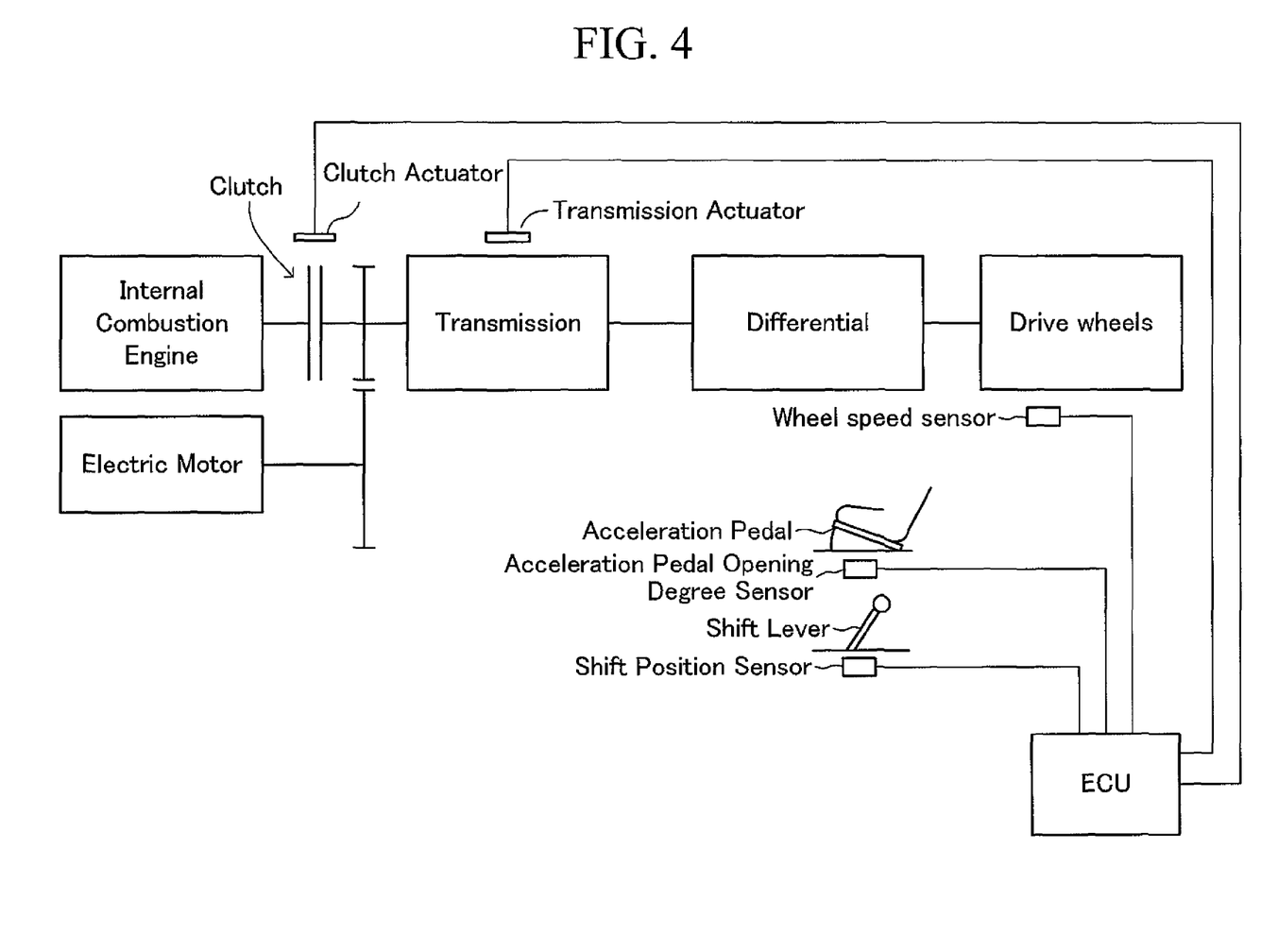
FIG. 4 is a schematic of a vehicle which mounts a conventional vehicular power transmission control apparatus.

In the meanwhile, in the hybrid vehicle described above, there is a connection state (hereinafter, referred to as an "IN-Connection State") which realize a power transmission path between an output shaft of the electric motor and an input shaft of a transmission. FIG. 4 shows an example of a conventional power transmission apparatus which adopts the IN-Connection State.

In this example, an output shaft of the internal combustion engine is connected to the input shaft of the transmission through a clutch. The clutch can change a state-of-connecting between the output shaft of the internal combustion engine and the input shaft of the transmission from a shut-off-state to break a power transmission path therebetween to a connection-state to realize the power transmission path therebetween, or vice versa. The output shaft of the electric motor is connected to the input shaft of the transmission through a gear mechanism so as to always provide a power transmission path therebetween. The output shaft of the transmission is connected to drive wheels through a differential mechanism so as to always provide a power transmission path therebetween. The transmission does not comprise a torque convertor and is configured to be able to set a gear position at one of a plurality of gear positions for driving or at a neutral gear position. When one of the plurality of gear positions for driving is selected, a power transmission path is provided between the input shaft of the transmission and the output shaft of the transmission. The plurality of gear positions for driving may include five gear positions as forward gear positions, and one gear position as a reverse gear position. When the neutral gear position is selected, the power transmission path is not provided between the input shaft of the transmission and the output shaft of the transmission.

Further, this example comprises a clutch actuator for controlling a state (state-of-connecting) of the clutch and a transmission actuator for controlling a state of the transmission. The clutch actuator and the transmission actuator are controlled by an ECU based on an output of a shift position sensor which detects a condition (a position) of a shift operation member (a shift lever) operated by a driver, an output of a wheel speed sensor which detects a wheel speed of wheels, and an output of an acceleration pedal opening degree sensor which detects an operation amount (opening degree) of an acceleration pedal. By the configuration above, the states of the transmission and the clutch are controlled in accordance with the position of the shift lever and a driving (running) condition of the vehicle.

A system in which each of the states of the transmission and the clutch is controlled by each of the actuators as described above is referred to as an automated manual transmission. That is, FIG. 4 shows a power transmission control apparatus applied to a hybrid vehicle adopting the IN-Connection State as the connection state of the output shaft of the electric motor, and the automated manual transmission.

Figure 5:
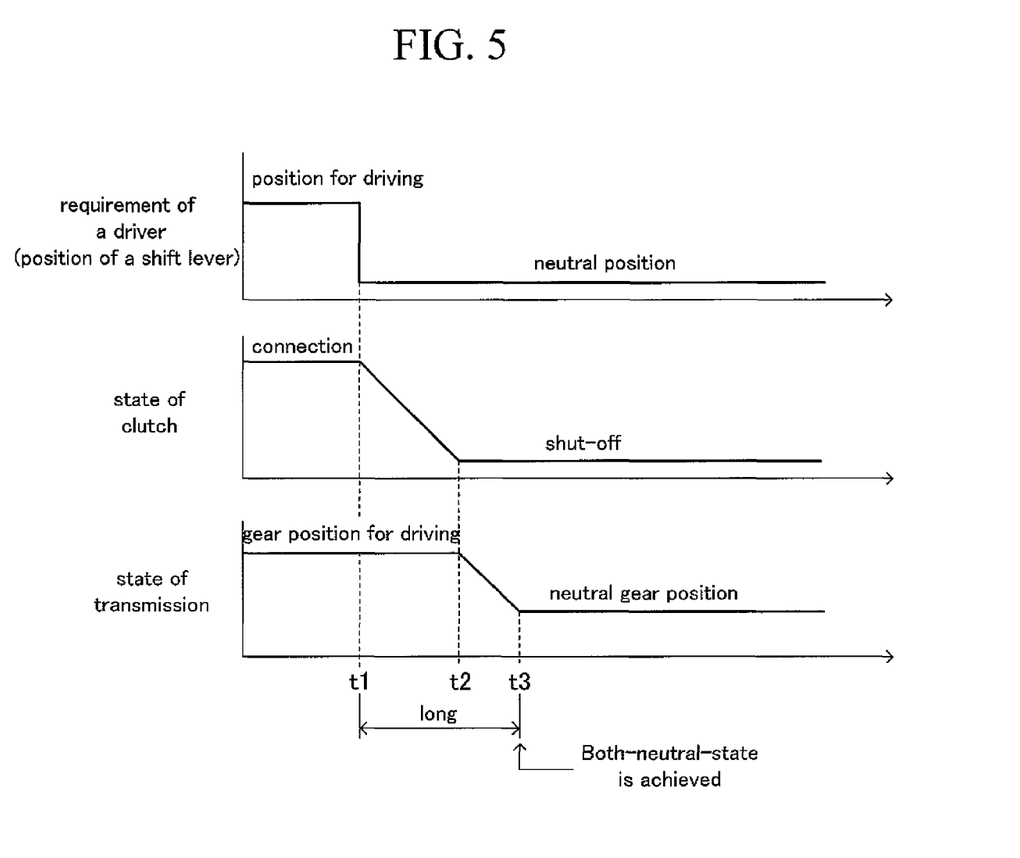
FIG. 5 is a time-line chart showing one example of a change in various members, when a both-neutral-state is required by a driver while the vehicle is running (driving), in the conventional vehicular power transmission control apparatus shown in FIG. 4.

In FIG. 5, a normal condition in which the vehicle is running is assumed (refer to a period before a time t1), in which the position of the shift lever being set at a position for driving (a forward position or a reverse position), the clutch being in the connection-state, and the gear position of the transmission being set at one of the gear positions for driving. In this normal condition, the power transmission path between the output shaft of the internal combustion engine and the output shaft of the transmission (and thus the driving wheels) is realized, since the clutch is in the connection-state (and the gear position of the transmission is set at the gear position for driving). Further, the power transmission path between the output shaft of the electric motor and the output shaft of the transmission (and thus the drive wheels) is realized, since the gear position of the transmission is set at the gear position for driving (i.e., the power transmission path between the input and output shafts of the transmission is realized).

Now, it is assumed that the driver changes the position of the shift lever from the position for driving to a neutral position at the time t1. When the driver selects the neutral position of the shift lever, the driver substantially requires a state (hereinafter, refereed to as a "both-neutral-state") in which both of "an internal-combustion-engine-neutral-state" and "an electric-motor-neutral-state" are accomplished. The internal-combustion-engine-neutral-state is a state in which the power transmission path between the output shaft of the internal combustion engine and the output shaft of the transmission (and thus the drive wheels) is not realized. The electric-motor-neutral-state is a state in which the power transmission path between the output shaft of the electric motor and the output shaft of the transmission (and thus the drive wheels) is not realized.

In order to achieve the both-neutral-state, the state-of-connecting of the clutch needs to be changed from the connection-state to the shut-off-state, and the gear position of the transmission need to be changed from one of the gear positions for driving to the neutral gear position. In order to change (over) the gear position of the transmission, it is necessary to realize a state in which the power transmission path between the output shaft of the internal combustion engine and the input shaft of the transmission is not realized (a power is not transmitted therebetween), prior to the changeover of the gear position of the transmission. This necessitates that the changeover of the gear position of the transmission from the gear position for driving to the neutral gear position is started (to be carried out), after the changeover of the state-of-connecting of the clutch from the connection-state to the shut-off-state is completed.

In view of the above, in the example shown in FIG. 5, at the time t1, only an operation for the changeover of the state-ofconnecting of the clutch from the connection-state to the shut-off-state is firstly started. Thereafter, the operation is completed at time t2. Accordingly, after the time t2, the internal-combustion-engine-neutral-state is continued to be realized. However, the electric-motor-neutral-state has not been realized yet at the time t2.

At the time t2, an operation for the changeover of the gear position of the transmission from the gear position for driving to the neutral gear position is started. Thereafter, at time t3, the operation for the changeover of the gear position is completed. As a result, after the time t3, the electric-motor-neutral-state is continued to be realized. That is, after the time t3, the both-neutral-state is continued to be realized.

As described above, in the conventional apparatus adopting the IN-Connection State, a considerable long time (from the time t1 to the time t3) is necessary from the timing at which the shift lever is moved to the neutral position (i.e., at the timing of requiring the both-neutral-state) to the timing at which the neutral state is actually realized. The considerable long time is a sum of "the time required for the operation of the changeover of the state-of-connecting of the clutch from the connection-state to the shut-off-state" and "the time required for the operation of the changeover of the gear position of the transmission from the gear position for driving to the neutral gear position". Accordingly, a need exists to shorten the time (period) from the timing of requiring the both-neutral-state by the driver to the timing of the actual realization of the both-neutral-state.

In the meantime, in the hybrid vehicle, another connection state (hereinafter, referred to as an "OUT-Connection State") can be adopted. The OUT-Connection State is a state in which a power transmission path is provided between the output shaft of the electric motor and the input shaft of the transmission (and thus the drive wheels) without involving the transmission. The applicant of the present invention has already proposed a changeover mechanism which can change a connection state of the output shaft of the electric motor between the IN-Connection-State and the OUT-Connection-State, in Japanese Patent Application No. 2007-271556. The changeover mechanism can further change the connection state of the output shaft of the electric motor to a state in which neither a power transmission path between the output shaft of the electric motor and the input shaft of the transmission nor a power transmission path between the output shaft of the electric motor and the output shaft of the transmission is provided. Hereinafter, this state is referred to as a "non-connection state".

The applicant of the present invention has realized (has found a finding) that it is possible to shorten the time (period) from the timing of requiring the both-neutral-state by the driver to the timing of the actual realization of the both-neutral-state by utilizing the changeover mechanism.

An object of the present invention is therefore to provide a vehicular power transmission control apparatus applied to a vehicle comprising an internal combustion engine and an electric motor as power sources, the control apparatus being able to appropriately select a connection state of an output shaft of the electric motor to thereby shorten the time (period) from the timing of requiring the both-neutral-state by the driver to the timing of the actual realization of the both-neutral-state.

The vehicular power transmission control apparatus according to the present invention comprises a transmission, a changeover mechanism, a clutch mechanism, a shift operation member, and control means.

The transmission comprises: an input shaft to provide a power transmission path between the input shaft of the transmission and an output shaft of the internal combustion engine; and an output shaft to provide a power transmission path between the output shaft of the transmission and drive wheels of the vehicle. The transmission is configured so as to be able to adjust a ratio (transmission reduction ratio) of a rotational speed of the input shaft of the transmission to a rotational speed of the output shaft of the transmission, (when the transmission is) in a power-transmission-state for a forward driving or for a reverse driving of the vehicle, the power-transmission-state being a state in which a power transmission path between the input shaft of the transmission and the output shaft of the transmission is realized.

The transmission may be a multiple gear ratio transmission which can realize any one of a plurality of predetermined reduction ratios different from each other as the transmission reduction ratio, or may be a continuously variable transmission which can adjust the reduction ratio continuously (or in non-stepwise fashion) as the transmission reduction ratio. The transmission may be configured so as to realize a neutral state in which a power transmission path between the input shaft of the transmission and the output shaft of the transmission is not realized, in addition to the power-transmission-state described above.

The shift operation member is a member operated by the driver of the vehicle to control the state of the transmission. Examples of the shift operation member may include: a shift lever having positions corresponding to the gear positions for driving (which may be classified into an automatic mode and a manual mode) and the neutral gear position; and a group of switches corresponding to the gear positions for driving and the neutral gear position.

Further, the transmission may be "a multiple gear ratio transmission or a continuously variable transmission (so-called automatic transmission (AT))" comprising a torque converter and being configured in such a manner that the gear position shifting operation is automatically performed in accordance with a driving condition of the vehicle, or may be "a multiple gear ratio transmission without the torque converter (so-called manual transmission (MT))". If the transmission is the manual transmission, the transmission of a type (a so-called automated manual transmission) is adopted in which the gear position shifting operation is performed by a drive force generated by an actuator(s) based on a signal indicative of the condition (position) of the shift operation member. In this type of the transmission, only the manual mode may be provided, or both of the manual mode and the automatic mode may be provided.

The changeover mechanism is configured so as to change a connection state of the output shaft of the electric motor (i.e., a connection state of the changeover mechanism) to any one from alternatives comprising two or more of an input-side-connection state, an output-side-connection state, and a non-connection state as an essential state, the input-side-connection state (IN-Connection State) being a state in which a power transmission path is provided between the output shaft of the electric motor and the input shaft of the transmission, the output-side-connection state (OUT-Connection State) being a state in which a power transmission path is provided between the output shaft of the electric motor and the output shaft of the transmission without involving the transmission, and the non-connection state being a state in which neither a power transmission path between the output shaft of the electric motor and the input shaft of the transmission, nor a power transmission path between the output shaft of the electric motor and the output shaft of the transmission is provided. That is, the changeover mechanism may be, but not limited to, one of the followings.

A changeover mechanism which can change the connection state of the output shaft of the electric motor into any one of the IN-Connection State and the non-connection state, only (i.e. which can realize any one from the IN-Connection State and the non-connection State, only).

A changeover mechanism which can change the connection state of the output shaft of the electric motor into any one of the OUT-Connection State and the non-connection state, only (i.e. which can realize any one from the OUT-Connection State and the non-connection state, only).

A changeover mechanism which can change the connection state of the output shaft of the electric motor into any one of the IN-Connection State, the OUT-Connection State, and the non-connection state (i.e. which can realize any one from the IN-Connection State, the OUT-connection state, and the non-connection state).

The clutch mechanism is disposed between the output shaft of the internal combustion engine and the input shaft of the transmission, and is configured so as to be able to change a state-of-connecting between the output shaft of the internal combustion engine and the input shaft of the transmission from a shut-off-state to break a power transmission path therebetween (i.e., between the output shaft of the internal combustion engine and the input shaft of the transmission) to a connection-state to provide the power transmission path therebetween, or vice versa.

The control means controls the transmission and the clutch mechanism based on the driving condition of the vehicle and the condition (position) of the shift operation member. Further, the control means controls the changeover mechanism base on the driving condition of the vehicle. Examples of the driving condition of the vehicle may include (or may be indicated by) a value correlating with a vehicle speed (speed of the vehicle), and a value correlating with a required driving torque obtained based on an operation of an acceleration operating member by the driver of the vehicle, and so on. Examples of the value correlating with the vehicle speed may include the vehicle speed itself, the rotational speed of the input shaft of the transmission, the rotational speed of the output shaft of the internal combustion engine, and the rotational speed of the output shaft of the electric motor, and so on. Examples of the value correlating with the required driving torque may include an operating amount of the acceleration operating member and an opening degree of a throttle valve disposed in an intake passage of the internal combustion engine, and so on.

The vehicular power transmission control apparatus according to the present invention is characterized in that, in a period (case) in which (1) the condition of the shift operation member is in the condition for the forward driving or for the reverse driving (e.g., the shift operation member is at the position for driving), (2) the state-of-connecting of the clutch mechanism is in the connection-state, (3) the transmission is in the power-transmission-state (e.g., the gear position of the transmission is set at the gear position for driving), and (4) the connection state of the changeover mechanism is in a state other than the non-connection state (specifically, in either the IN-Connection State or the OUT-Connection State), the control means is configured so as to change the state-of-connecting of the clutch mechanism from the connection-state to the shut-off-state, and so as to change the connection state of the changeover mechanism from the state other than the non-connection state to the non-connection state, upon changing of the condition of the shift operation member from the condition for the forward driving or for the reverse driving to "a condition in which the both-neutral-state is required (e.g., the neutral position)", the both-neutral-state being a state in which neither the power transmission path between the output shaft of the internal combustion engine and the output shaft of the transmission, nor the power transmission path between the output shaft of the electric motor and the output shaft of the transmission is provided.

According to the configuration described above, in the case in which the both-neutral-state is required by the driver, "the internal-combustion-engine-neutral-state" is achieved by changing the state-of-connecting of the clutch mechanism from the connection-state to the shut-off-state, and "the electric-motor-neutral-state" is achieved by changing the connection state of the changeover mechanism from the state other than the non-connection state to the non-connection state. That is, "the both-neutral-state" is achieved, at a timing of the completion of the operation for the changeover of the clutch mechanism from the connection-state to the shut-off-state or at a timing of the completion of the operation for the changeover of the connection state of the changeover mechanism from the state other than the non-connection state to the non-connection state, whichever comes later.

It should be noted that, in the case in which the both-neutral-state is required by the driver, the state of the transmission may or may not be changed from the power-transmission-state (e.g., a state in which the gear position is set at the gear position for driving) to the neutral state (e.g., a state in which the gear position is set at the neutral gear position). This is because, when the state-of-connecting of the clutch mechanism is in the shut-off-state and the connection state of the changeover mechanism is in the non-connection state, the both-neutral-state are achieved, regardless of whether the state of the transmission is in the power-transmission-state or in the neutral state.

Unlike the changeover of the gear position of the transmission, the changeover of the connection state of the changeover mechanism can be carried out, even if a state is not realized prior to the changeover of the connection state of the changeover mechanism, the state being a state in which the power transmission path between the output shaft of the internal combustion engine and the input shaft of the transmission is not provided. In other words, the operation for the changeover of the connection state of the changeover mechanism can be started (to be carried out), at a timing before the completion of the operation for the changeover of the state-of-connecting of the clutch mechanism from the connection-state to the shut-off-state (e.g., a timing which is before or is the same time as a commencement of the operation for the changeover of the state-of-connecting of the clutch mechanism).

Accordingly, the control apparatus according to the present invention can shorten the time (period) from the timing of requiring the both-neutral-state by the driver to the timing of the actual realization of the both-neutral-state, compared to the above described conventional case shown in FIG. 5. Especially, if the clutch mechanism and the changeover mechanism are configured in such a manner that the operation for the changeover of the connection state of the changeover mechanism from the state other than the non-connection state to the non-connection state is completed, before the operation for the changeover of the state-of-connecting of the clutch mechanism from the connection-state to the shut-off-state is completed, the both-neutral-state can be accomplished at the timing (corresponding to the time t2 shown in FIG. 5) at which the operation for the changeover of the state-of-connecting of the clutch mechanism from the connection-state to the shut-off-state is completed. In this case, compared to the case shown in FIG. 5, it is possible to shorten the time (period) from the timing at which the both-neutral-state is required by the driver to the timing at which the both-neutral-state is actually achieved, by a time (period, from the time t2 to the time t3 shown in FIG. 5) necessary for the changeover of the state of the transmission from the gear position for driving to the neutral gear position.

In the vehicular power transmission control apparatus according to the present invention, it is preferable that the control means be configured so as to, from a timing at which the condition of the shift operation member is changed from the condition for the forward driving or for the reverse driving to the condition in which the both-neutral-state is required, start changing the state-of-connecting of the clutch mechanism from the connection-state to the shut-off-state and changing the connection state of the changeover mechanism from the state other than the non-connection state to the non-connection state.

According to the configuration described above, the both-neutral-state is achieved when a certain time has elapsed from the timing at which the both-neutral-state is required by the driver, the certain time being "the time period necessary for the operation of the changeover of the connecting-state of the clutch mechanism from the connection-state to the shut-off-state" or "the time period necessary for the operation of the changeover of the connection state of the changeover mechanism from the state other than the non-connection state to the non-connection state", whichever is longer. Consequently, the both-neutral-state can be accomplished at the earliest time.

Further, in a case in which the both-neutral-state is required by the driver and the state of the transmission is changed from the power-transmission-state to the neutral state, the control means is preferably configured so as to change (start changing) the state of the transmission from the power-transmission-state to the neutral state after the changeover of the state-of-connecting of the clutch mechanism from the connection-state to the shut-off-state is completed. According to the configuration described above, the state of the transmission (the gear position) is changed over, while the power transmission is not being performed between the output shaft of the internal combustion engine and the input shaft of the transmission. Accordingly, this allows the state of the transmission to be smoothly changed from the power-transmission-state to the neutral state without applying a load to the transmission.

In this case, it is preferable that the changeover of the state of the transmission from the power-transmission-state to the neutral state be started from the timing at which the changeover of the state-of-connecting of the clutch mechanism from the connection-state to the shut-off-state is completed. This allows the changeover of the state of the transmission from the power-transmission-state to the neutral state to be completed at the earliest time without applying a load to the transmission.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Next will be described embodiments of a vehicular power transmission control apparatus according to the present invention with reference to the drawings.
(Configuration)

Figure 1:
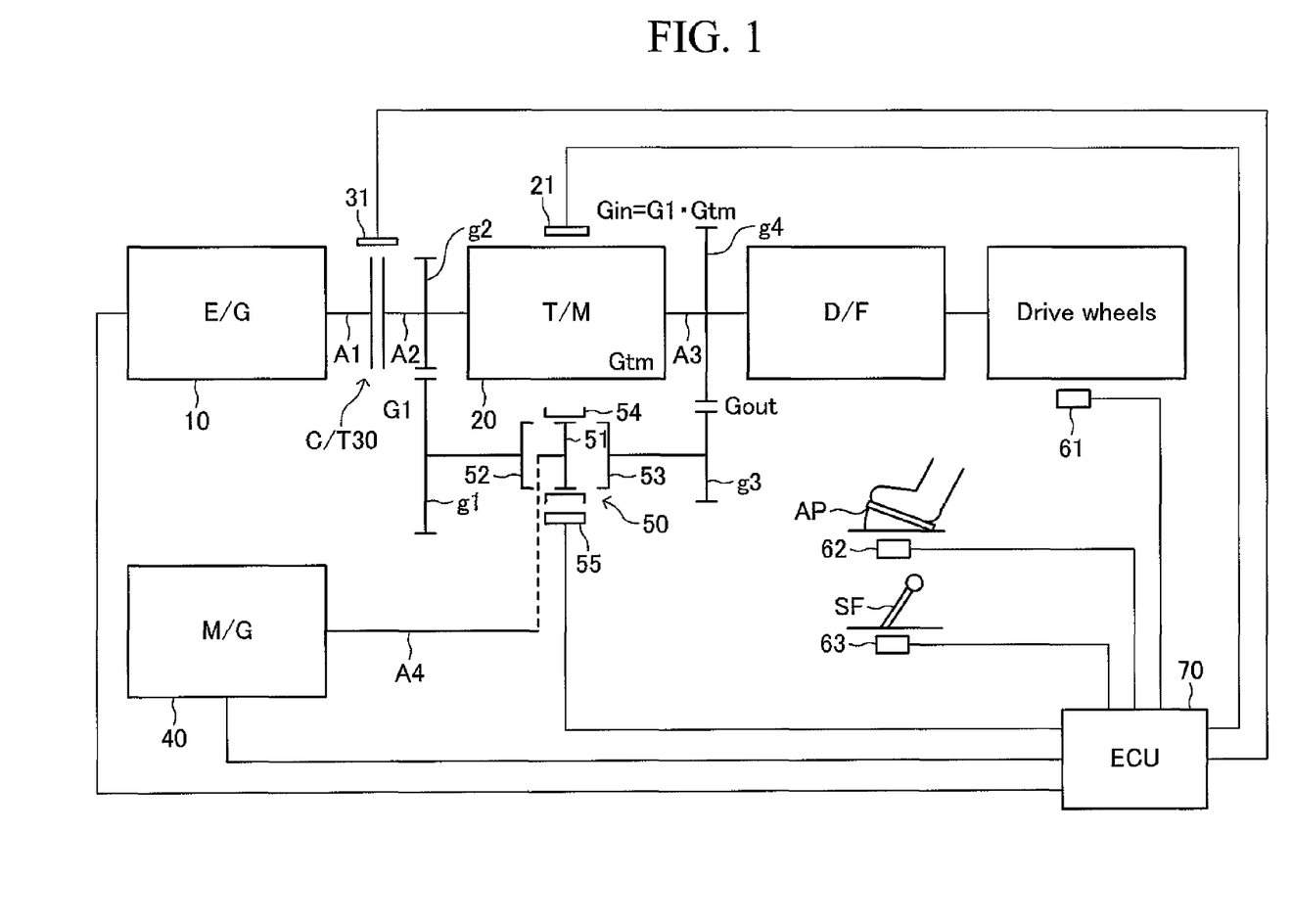
FIG. 1 is a schematic view of a vehicle which mounts a vehicular power transmission control apparatus according to an embodiment of the present invention.

FIG. 1 shows a schematic configuration of a vehicle mounting a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission, but which does not have a torque converter.

The vehicle comprises the engine (E/G) 10, the transmission (T/M) 20, a clutch (C/T) 30, the motor generator (M/G) 40, and a changeover mechanism 50. The E/G 10 is one of well-known internal combustion engines, including a gasoline engine which uses a gasoline as a fuel and a diesel engine which uses a light diesel oil as a fuel. An output shaft A1 of the E/G 10 is connected to an input shaft A2 of the T/M 20 through the C/T 30.

The T/M 20 is one of well-known multiple gear ratio transmissions. The T/M 20 has a plurality of gear positions (e.g., five gear positions) as forward gear positions, one gear position as a reverse gear position, and a neutral gear position. The T/M 20 does not comprise a torque convertor. Hereinafter, the gear positions as forward gear positions and the gear position as the reverse gear position are referred to as "gear positions for driving". When any one of the gear positions for driving is realized, a power transmission path between the input shaft A2 and the output shaft A3 of the T/M 20 is realized. When the neutral gear position is realized, a power transmission path between the output shafts A2 and A3 of the T/M 20 is not realized. When any one of the gear positions for driving is realized, the T/M 20 is configured so as to be able to set a transmission reduction ratio Gtm at one of a plurality of reduction ratios. The transmission reduction ratio Gtm is a ratio of a rotational speed of the input shaft A2 to a rotational speed of the output shaft A3. The T/M 20 changes the gear position only by controlling a T/M actuator 21.

The C/T 30 comprises one of well-known structures and is configured in such a manner that the C/T 30 can break (or shut-off) and provide (or realize, form) a power transmission path between the output shaft A1 of the E/G 10 and the input shaft A2 of the T/M 20. In the vehicle, a clutch pedal is not provided. A state-of-connecting of the C/T 30 is controlled only by an actuator 31. When the C/T 30 is in a connection state, the output shaft A1 of the E/G 10 and the input shaft A2 of the T/M 20 rotate at the same rotational speed.

The M/G 40 comprises one of well-known structures (e.g., an AC synchronous motor), and is configured in such a manner that a rotor (not shown) rotates integrally with an output shaft A4. The M/G 40 functions as the power source as well as the electric power generator.

The changeover mechanism 50 is a mechanism which changes (over) a connection state of the output shaft A4 of the M/G 40. The changeover mechanism 50 comprises a connection piece 51 which rotates integrally with the output shaft A4 of the M/G 40, a connection piece 52 which rotates integrally with a gear g1, a connection piece 53 which rotates integrally with a gear g3, a sleeve 54, and a changeover actuator 55. The gear g1 always meshes with the gear g2 which rotates integrally with the input shaft A2 of the T/M 20. The gear g3 always meshes with a gear g4 which rotates integrally with the output shaft A3 of the T/M 20.

The sleeve 54 is provided so as to be coaxially with the output shaft A4 of the M/G 40 and movable in an axial direction of the output shaft A4 of the M/G 40. A position of the sleeve 54 along the axial direction is controlled by the changeover actuator 55. The sleeve 54 is able to spline-engage with the connection pieces 51, 52, and 53.

Figure 2A:
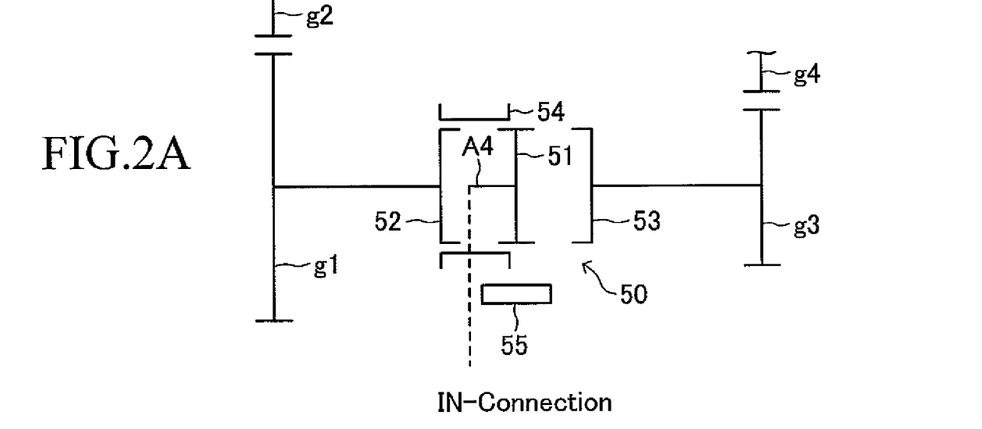
FIG. 2A is a schematic view showing one of three states which the changeover mechanism shown in FIG. 1 can realize.

When the sleeve 54 is controlled to an IN-Connection position shown in FIG. 2A, the sleeve 54 spline-engages with the connection pieces 51 and 52. Accordingly, a power transmission path between the input shaft A2 of the T/M 20 and the output shaft A4 of the M/G 40 is realized. This state is referred to as an "IN-Connection State".

In the IN-Connection State, a ratio of a rotational speed of the output shaft A4 of the M/G 40 to a rotational speed of the input shaft A2 of the T/M 20 is referred to as a "first reduction ratio G1", and a product (G1·Gtm) of the first reduction ratio G1 and the transmission reduction ratio Gtm is referred to as an "IN-connection reduction ratio Gin". In the present example, G1=(the number of teeth of the gear g2)/(the number of teeth of the gear g1), and therefore, Gin=Gtm·(the number of teeth of the gear g2)/(the number of teeth of the gear g1). That is, the IN-connection reduction ratio Gin varies in accordance with a change in the gear position of the T/M 20.

Figure 2B:
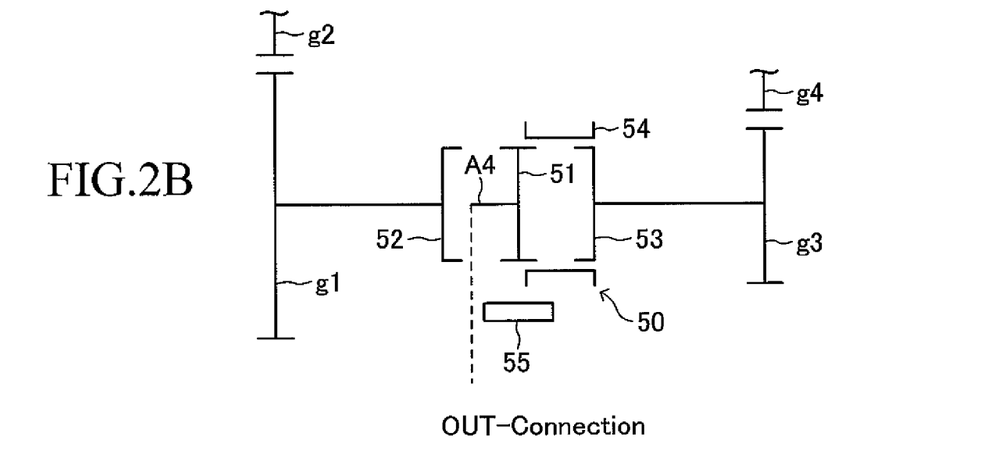
FIG. 2B is a schematic view showing one of three states which the changeover mechanism shown in FIG. 1 can realize.

When the sleeve 54 is controlled to an OUT-Connection position shown in FIG. 2B, the sleeve 54 spline-engages with the connection pieces 51 and 53. Accordingly, a power transmission path between the output shaft A3 of the T/M 20 and the output shaft A4 of the M/G 40 is realized through the gear g3 and the gear g4, without involving the T/M 20. This state is referred to as an "OUT-Connection State".

In the OUT-Connection State, a ratio of a rotational speed of the output shaft A4 of the M/G 40 to a rotational speed of the output shaft A3 of the T/M 20 is referred to as an "OUT-connection reduction ratio Gout". In the present example, the OUT-connection reduction ratio Gout is equal to (the number of teeth of the gear g4)/(the number of teeth of the gear g3) and thus is constant. That is, the OUT-connection reduction ratio Gout does not vary in accordance with a change in the gear position of the T/M 20.

Figure 2C:
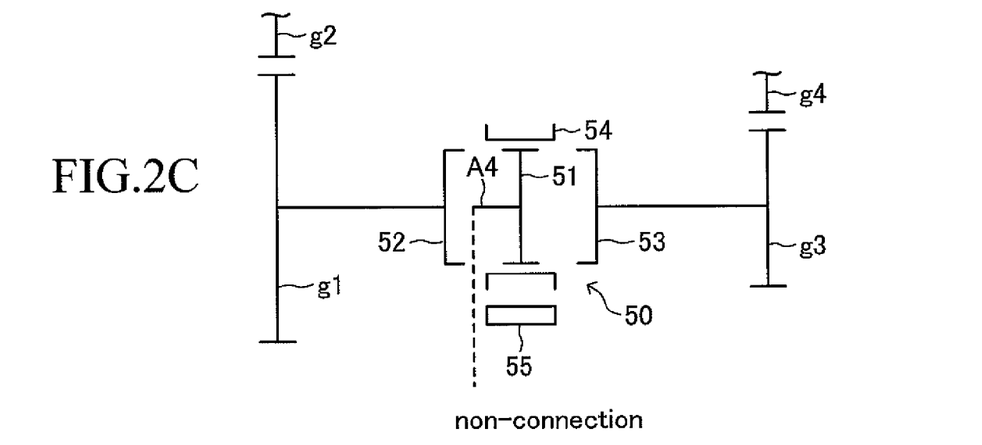
FIG. 2C is a schematic view showing one of three states which the changeover mechanism shown in FIG. 1 can realize.

When the sleeve 54 is controlled to a non-connection position shown in FIG. 2C, the sleeve 54 spline-engages only with the connection piece 51. Accordingly, neither a power transmission path between the output shaft A3 of the T/M 20 and the output shaft A4 of the M/G 40, nor a power transmission path between the input shaft A2 of the T/M 20 and the output shaft A4 of the M/G 40 is realized. This state is referred to as a "non-connection state (neutral state)".

As described above, the changeover mechanism 50 selectively changes the connection state of the output shaft A4 of the M/G 40 (i.e., the connection state of the changeover mechanism 50) into one of "the IN-Connection State", "the OUT-Connection State", and "the neutral connection state", by controlling the changeover actuator 55.

The output shaft A3 of the T/M 20 is connected with a differential mechanism D/F which is connected with a pair of drive wheels including a left drive wheel and a right drive wheel. It should be noted that a so-called final reduction ratio mechanism may be provided between the output shaft A3 of the T/M 20 and the differential mechanism D/F.

The present apparatus further comprises a wheel speed sensor 61 which detects a wheel speed of the drive wheels, an acceleration pedal opening degree sensor 62 which detects an operation amount of an acceleration pedal AP, and a shift position sensor 63 which detects a position of a shift lever SF.

The present apparatus further comprises an electronic control unit ECU 70. The ECU 70 controls the actuators 21, 31, and 55, based on information and so on from the sensors 61-63, to thereby control the gear position of the T/M 20, the state-of-connecting of the C/T 30, and the state of the changeover mechanism 50. Further, the ECU 70 controls the output (driving torque) of each of the E/G 10 and M/G 40.

The gear position of the T/M 20 is controlled based on a vehicle speed obtained from the wheel speed sensor 61, a required driving torque of the drive wheels, and a position of the shift lever SF obtained from the shift position sensor 63. The required driving torque of the drive wheels is calculated based on the operation amount of the acceleration pedal AP obtained from the acceleration pedal opening degree sensor 62. The operation amount of the acceleration pedal AP and the position of the shift lever SF are changed by the driver. When the position of the shift lever SF is at a position corresponding to a "manual mode", the gear position of the T/M 20 is basically set at a gear position selected by (the position of) the shift lever SF operated by the driver. On the other hand, when the position of the shift lever SF is at a position corresponding to an "automatic mode", the gear position of the T/M 20 is automatically controlled based on "a combination of the vehicle speed and the required driving torque", even when the shift lever SF is not operated.

The state-of-connecting of the C/T 30 is generally kept at the connection state, and is temporarily changed from the connection state to the shut-off state (1) while the shift up operation or the shift down operation of the T/M 20 is being carried out, or (2) when the position of the shift lever SF is at "the neutral position", etc.

The M/G 40 is used as a (driving) power source generating a driving torque for driving the vehicle together with the E/G 10 or by itself, or is used as a power source for starting the E/G 10. Further, the M/G 40 is used as an electric motor generator for generating a regeneration torque to provide a breaking force to the vehicle, or is used as an electric motor generator for generating an electric power which is supplied to and stored in a battery (not shown) of the vehicle.

When the M/G 40 is used as the driving power source for driving the vehicle, a distribution between the output (driving torque) of the E/G 10 and the output (driving torque) of the M/G 40 is adjusted in such a manner that a sum of the driving torque transmitted to the drive wheels based on the output of the E/G 10 and the driving torque transmitted to the drive wheels based on the output of the M/G 40 coincides with the required driving torque, according to one of well-known methods.

The changeover mechanism 50 is controlled to realize any one of the IN-Connection State, the OUT-Connection State, and the non-connection state, based on the combination of the vehicle speed (the speed of the vehicle) and the required driving torque.

(An Operation when the Both-Neutral-State is Required by the Driver)

In the present embodiment, it is assumed that the driver requires "a both-neutral-state" when the position of the shift lever SF is at "the neutral position". "The both-neutral-state" means a state in which both of "an E/G-neutral-state" and "an M/G-neutral-state" are accomplished. The E/G-neutral-state is a state in which a power transmission path between the output shaft A1 of the E/G 10 and the output shaft A3 of the T/M 20 (and thus the drive wheels) is not realized. The M/G-neutral-state is a state in which a power transmission path between the output shaft A4 of the M/G 40 and the output shaft A3 of the T/M 20 (and thus the drive wheels) is not realized.

Figure 3:
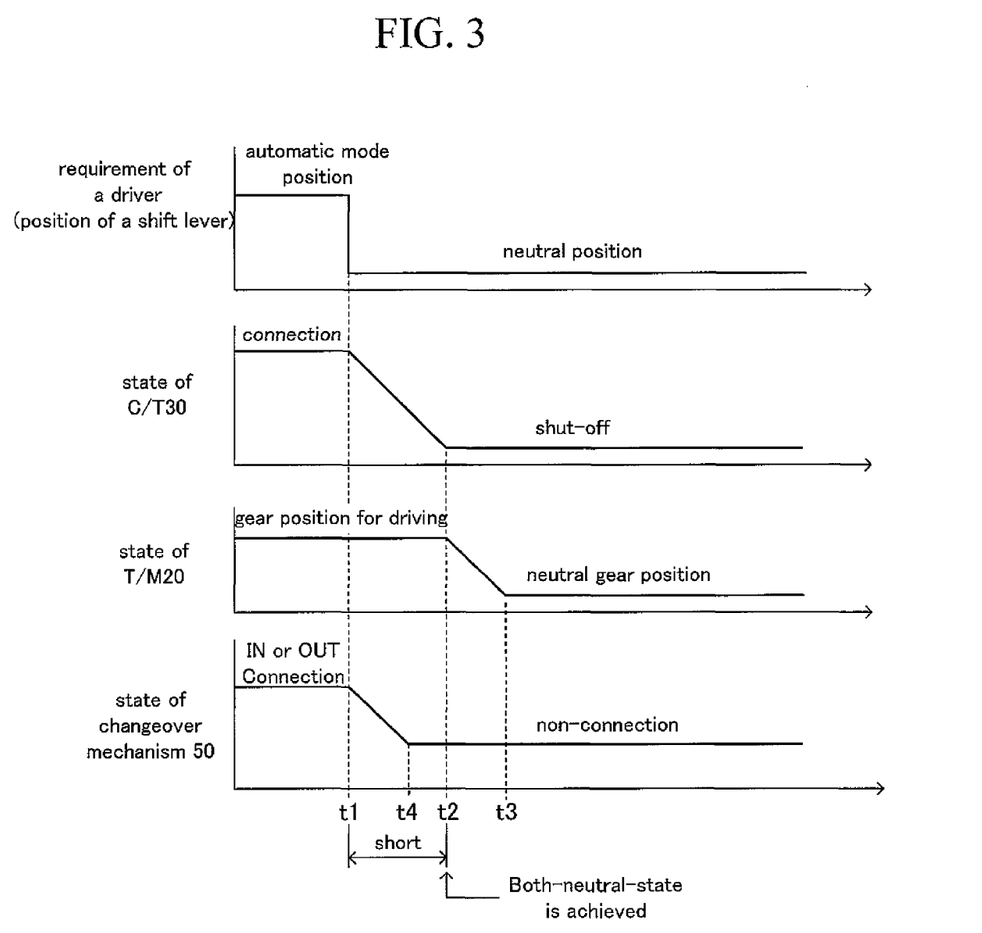
FIG. 3 is a time-line chart showing one example of a change in various members, when a both-neutral-state is required by a driver while the vehicle is running (driving), in the embodiment shown in FIG. 1.

Next will be described an operation of the present apparatus, when the both-neutral-state is required by the driver while the vehicle is driving, with reference to FIG. 3. FIG. 3 is a time-line chart which corresponds to FIG. 5 described above. A time t1, a time t2, and a time t3 shown in FIG. 3 correspond to the time t1, the time t2, and the time t3 shown in FIG. 5, respectively.

In the example shown in FIG. 3, during a time period before the time t1 in which the vehicle is driving, the position of the shift lever SF is at the position corresponding to "the automatic mode", the state-of-connecting of the C/T 30 is in the connection state, the gear position of the T/M 20 is set at one of the gear positions for driving, and the state of the changeover mechanism 50 is in either "the IN-Connection State" or "the OUT-Connection State". In this state, since the state-of-connecting of the C/T 30 is in the connection state (and the gear position of the T/M 20 is set at the gear position for driving), the power transmission path between the output shaft A1 of the E/G 10 and the output shaft A3 of the T/M 20 (and thus the drive wheels) is realized. Further, in "the IN-Connection State", the gear position of the T/M 20 is set at the gear positions for driving (i.e., the power transmission path between the input and output shafts A2 and A3 is realized). Accordingly, the power transmission path between the output shaft A4 of the M/G 40 and the output shaft A3 of the T/M 20 (and thus the drive wheels) is realized in the "IN-Connection State". As described above, in the OUT-Connection State, the power transmission path between the output shaft A4 of the M/G 40 and the output shaft A3 of the T/M 20 (and thus the drive wheels) is realized.

Now, it is assumed that, under the state describe above, the driver changes the position of the shift lever SF from the position corresponding to "the automatic mode" to the neutral position at the time t1. That is, it is assumed that the requirement for the both-neutral-state by the driver occurs at the time t1.

In the present apparatus, when the both-neutral-state is required by the driver, the state-of-connecting of the C/T 30 is changed from the connection-state to the shut-off-state so that "the E/G-neutral-state" is achieved, and the state of the changeover mechanism 50 is changed from either one of "the IN-Connection State" and the "OUT-Connection State" to the non-connection state so that "the M/G-neutral-state" is achieved.

In the meantime, "a condition in which the power is not transmitted between the output shaft A1 of the E/G 10 and the input shaft A2 of the T/M 20" must be realized, before the changeover of the gear position of the T/M 20 is carried out. In other words, in order to change the gear position of the transmission, it is necessary to establish the condition in which the power transmission path between the output shaft A1 and the input shaft A2 is shut off, prior to the changeover of the gear position of the T/M 20. To the contrary, it is not necessary to establish the condition in which the power transmission path between the output shaft A1 and the input shaft A2 is shut off, prior to the changeover of the connection state of the changeover mechanism 50. In view of the above, the present apparatus (simultaneously) starts both of "the operation for the changeover of the state-of-connecting of the C/T 30 from the connection-state to the shut-off-state and the operation for the changeover of the connection state of the changeover mechanism 50 from either one of "the IN-Connection State and the OUT-Connection State" to the non connection state, at the timing at which the both-neutral-state is required by the driver (i.e., at the time t1).

In the present apparatus, a time necessary for (completing the operation of) the changeover of the connection state of the changeover mechanism 50 from either one of "the IN-Connection State and the OUT-Connection State" to the non-connection state is set to be shorter than a time necessary for (completing the operation of) the changeover of the state-of-connecting of the C/T 30 from the connection-state to the shut-off-state. Accordingly, firstly, the changeover of the connection state of the changeover mechanism 50 from either one of "the IN-Connection State and the OUT-Connection State" to the non-connection state is completed (has ended) at time t4. This provides "the M/G-neutral-state". In the meantime, the E/G-neutral-state has not been achieved yet.

At the time t2 after the time t4, the changeover of the state-of-connecting of the C/T 30 from the connection-state to the shut-off-state is completed (has ended). This provides "the E/G-neutral-state". Consequently, "the both-neutral-state" is accomplished.

At the time t2 at which the condition in which the power is not transmitted between the output shaft A1 of the E/G 10 and the input shaft A2 of the T/M 20" is satisfied because of the completion of "the E/G-neutral-state", the operation for the changeover of the gear position of the T/M 20 from the gear position for driving to the neutral gear position is started. This changeover is completed (ends) at time t3.

Next will be described the function of the present apparatus. In the present apparatus, from the timing at which the both-neutral-state is required by the driver, the operation for the changeover of the state-of-connecting of the C/T 30 from the connection-state to the shut-off-state and the operation for the changeover of the connection state of the changeover mechanism 50 from either one of "the IN-Connection State and the OUT-Connection State" to the non-connection state have been commenced. As described above, in the present apparatus, the time period (refer to the time period from the time t1 to the time t4 in FIG. 3) necessary for (completing the operation of) the changeover of the connection state of the changeover mechanism 50 from either one of "the IN-Connection State and the OUT-Connection State" to the non-connection state is set so as to be shorter than the time period (refer to the time period from the time t1 to the time t2 in FIG. 3) necessary for (completing the operation of) the changeover of the state-of-connecting of the C/T 30 from the connection-state to the shut-off-state. Accordingly, the operation for the changeover of the state-of-connecting of the C/T 30 from the connection-state to the shut-off-state ends (is completed), after the completion of the operation for the changeover of the connection state of the changeover mechanism 50 from either one of "the IN-Connection State and the OUT-Connection State" to the non-connection state. Consequently, at the timing (refer to the time t2 in FIG. 3) at which the changeover of the state-of-connecting of the C/T 30 from the connection-state to the shut-off-state ends (is completed), the both-neutral-state is achieved.

To the contrary, in the above-described conventional apparatus whose operation is shown in FIG. 5, the both-neutral-state is achieved at the timing (corresponding to the time t3 in FIG. 3) at which the changeover of the gear position of the T/M 20 from the gear position for driving to the neutral gear position is completed. That is, the present apparatus can shorten the time period from the timing at which the both-neutral-state is required by the driver to the timing at which the both-neutral-state is actually achieved, by the time necessary for the operation of the changeover of the gear position of the T/M 20 from the gear position for driving to the neutral gear position (refer to the time period from the time t2 to the time t3 in FIG. 3), compared to the conventional apparatus described above.

As described above, the vehicular power transmission control apparatus according to the embodiment of the present invention is applied to the vehicle comprising, as power sources, the E/G 10 and the M/G 40, and further comprising the so-called automated manual transmission utilizing the T/M 20 which does not comprise a torque convertor. The apparatus comprises the changeover mechanism 50 which can select, as the connection state of the output shaft A4 of the M/G 40, any one of "the IN-Connection State", "the OUT-Connection State", and "the non-connection state". The IN-Connection State is the state in which the power transmission path between the input shaft A2 of the T/M 20 and the output shaft A4 of the M/G 40 is provided. The OUT-Connection State is the state in which the power transmission path between the output shaft A3 of the T/M 20 and the output shaft A4 of the M/G 40 is provided (without involving the T/M 20). The non-connection state is the state in which no power transmission path among these shafts is provided. While the vehicle is driving, the selection is made based on the combination of the vehicle speed and the required driving torque. Further, while the vehicle is driving, that is, in a period in which (1) the position of the shift lever SF is at the position for driving (e.g. the position corresponding to "the automatic mode"), (2) the state-of-connecting of the C/T 30 is in the connection state, (3) the gear position of the T/M 20 is set at the gear position for driving, and (4) the state of the changeover mechanism 50 is in either "the IN-Connection State" or "the OUT-Connection State", and when the driver changes the position of the shift lever SF from the position for driving to the neutral position (i.e., when the both-neutral-state is required by the driver), both "the operation for the changeover of the state-of-connecting of the C/T 30 from the connection-state to the shut-off-state" and "the operation for the changeover of the connection state of the changeover mechanism 50 from either one of the IN-Connection State and the OUT-Connection State to the non-connection state" are simultaneously started, at the timing of the occurrence of the requirement for the both-neutral-state.

Consequently, the completion of the (operation for the) changeover of the state-of-connecting of the C/T 30 from the connection-state to the shut-off-state or the completion of the (operation for the) changeover of the connection state of the changeover mechanism 50 from either one of "the IN-Connection State and the OUT-Connection State" to the non-connection state, whichever occurs later, provides the achievement of "the both-neutral-state". To the contrary, in the conventional apparatus whose operation is shown in FIG. 5, "the both-neutral-state" is achieved when the operation for the changeover of the gear position of the T/M 20 from the gear position for driving to the neutral gear position is completed, the operation for the changeover of the gear position of the T/M 20 being started after the completion of the changeover of the state-of-connecting of the C/T 30 from the connection-state to the shut-off-state. Accordingly, the present apparatus can shorten the time (period) from the timing of requiring the both-neutral-state by the driver to the timing of the actual realization of the both-neutral-state.

The present invention is not limited to the embodiment described above, but may be modified as appropriate without departing from the scope of the invention. For example, the so-called automated manual transmission which uses the multiple gear ratio transmission but which does not include a torque converter is used as the transmission, however, a multiple gear ratio transmission or a continuously variable transmission (a so-called automatic transmission (AT)) may be used as the transmission, each including a torque convertor and automatically performing an operation for a gear position change in accordance with the driving condition of the vehicle.

Further, in the embodiment described above, the changeover mechanism 50 is configured so as to be able to select any one from "the IN-Connection State", "the OUT-Connection State", and "the non-connection state (the neutral state)", however, the changeover mechanism 50 may be configured so as to be able to select any one from only "the non-connection state" and the IN-Connection State". Furthermore, the changeover mechanism 50 may be configured so as to be able to select any one from only "the non-connection state and the OUT-Connection State".

Further, in the embodiment described above, the connection state of the output shaft A4 of the M/G 40 (i.e., the connection state of the changeover mechanism 50) is selected based on the combination of the vehicle speed and the required driving torque, but the connection state of the output shaft A4 of the M/G 40 may be selected based on a combination of "any one from the vehicle speed, the rotational speed of the output shaft A1 of the E/G 10, the rotational speed of the input shaft A2 of the T/M 20, and the rotational speed of the output shaft A4 of the M/G 40" and "any one from the required driving torque, the operation amount of the acceleration pedal AP, and the opening degree of a throttle valve (not shown) disposed in an intake passage of the E/G 10".

Further, the embodiment described above simultaneously starts both of "the operation for the changeover of the state-of-connecting of the C/T 30 from the connection-state to the shut-off-state" and "the operation for the changeover of the connection state of the changeover mechanism 50 from either one of the IN-Connection State and the OUT-Connection State to the non connection state", at the timing at which the both-neutral-state is required by the driver (refer to the time t1 shown in FIG. 3). However, one of or both of "the operation for the changeover of the state-of-connecting of the C/T 30 from the connection-state to the shut-off-state" and "the operation for the changeover of the connection state of the changeover mechanism 50 from either one of the IN-Connection State and the OUT-Connection State to the non-connection state" may be started after the timing at which the both-neutral-state is required by the driver.

Further, in the embodiment described above, the time necessary for (completing the operation of) the changeover of the connection state of the changeover mechanism 50 from either one of "the IN-Connection State and the OUT-Connection State" to the non-connection state is set to be shorter than the time necessary for (completing the operation of) the changeover of the state-of-connecting of the C/T 30 from the connection-state to the shut-off-state. However, the time necessary for (completing the operation of) the changeover of the connection state of the changeover mechanism 50 from either one of "the IN-Connection State and the OUT-Connection State" to the non-connection state may be set to be longer than the time necessary for (completing the operation of) the changeover of the state-of-connecting of the C/T 30 from the connection-state to the shut-off-state. In this case, the time-relation between the time t2 and the time t4 shown in FIG. 3 is reversed, and the both-neutral-state is achieved at the time t4.

Further, in the embodiment described above, in a case in which the both-neutral-state is required by the driver, the operation for the changeover of the gear position of the T/M 20 from the gear position for driving to the neutral gear position is started at the timing at which the operation of the changeover of the state-of-connecting of the C/T 30 from the connection-state to the shut-off-state is completed (refer to the time t2 in FIG. 3), however, the operation for the changeover of the gear position of the T/M 20 from the gear position for driving to the neutral gear position needs not be performed.

What is claimed is:

1. A vehicular power transmission control apparatus applied to a vehicle comprising an internal combustion engine and an electric motor as power sources, comprising:
    a transmission including an input shaft to provide a power transmission path between said input shaft of said transmission and an output shaft of said internal combustion engine, and an output shaft to provide a power transmission path between said output shaft of said transmission and drive wheels of said vehicle, wherein said transmission is capable of adjusting a transmission reduction ratio which is a ratio of a rotational speed of said input shaft of said transmission to a rotational speed of said output shaft of said transmission when said transmission is in a power-transmission-state for a forward driving of said vehicle or for a reverse driving of said vehicle;
    a changeover mechanism which is capable of changing a connection state to any one from alternatives comprising two or more of an input-side-connection state, an output-side-connection state, and a non-connection state as an essential state,
        said input-side-connection state being a state in which a power transmission path is provided between said output shaft of said electric motor and said input shaft of said transmission,
        said output-side-connection state being a state in which a power transmission path is provided between said output shaft of said electric motor and said output shaft of said transmission without involving said transmission, and
        said non-connection state being a state in which neither a power transmission path between said output shaft of said electric motor and said input shaft of said transmission, nor a power transmission path between said output shaft of said electric motor and said output shaft of said transmission is provided;
    a clutch mechanism, disposed between said output shaft of said internal combustion engine and said input shaft of said transmission, and being capable of changing a state-of-connecting between said output shaft of said internal combustion engine and said input shaft of said transmission from a shut-off-state to break said power transmission path between said output shaft of said internal combustion engine and said input shaft of said transmission to a connection-state to provide said power transmission path between said output shaft of said internal combustion engine and said input shaft of said transmission, or vice versa;
    a shift operation member operated by a driver of said vehicle to control a state of said transmission; and
    control means for controlling said transmission and said clutch mechanism based on a driving condition of said vehicle and a condition of said shift operation member, and for controlling said changeover mechanism base on said driving condition of said vehicle: and wherein,
    said control means is configured so as to change said state-of-connecting of said clutch mechanism from said connection-state to said shut-off-state and so as to change said connection state of said changeover mechanism from a state other than said non-connection state to said non-connection state, upon changing of said condition of said shift operation member from a condition for said forward driving or for said reverse driving to a condition in which a both-neutral-state is required, said both-neutral-state being a state in which neither said power transmission path between said output shaft of said internal combustion engine and said output shaft of said transmission, nor said power transmission path between said output shaft of said electric motor and said output shaft of said transmission is provided, in a period in which (1) said condition of said shift operation member is in said condition for said forward driving or for said reverse driving, (2) said state-of-connecting of said clutch mechanism is in said connection-state, (3) said transmission is in said power-transmission-state, and (4) said connection state of said changeover mechanism is in said state other than said non-connection state.

2. A vehicular power transmission control apparatus according to claim 1, wherein said control means is configured so as to, from a timing at which said condition of said shift operation member is changed from said condition for said forward driving or for said reverse driving to said condition in which said both-neutral-state is required, start changing said state-of-connecting of said clutch mechanism from said connection-state to said shut-off-state and changing said connection state of said changeover mechanism from said state other than said non-connection state to said non-connection state.

3. A vehicular power transmission control apparatus according to claim 1, wherein
    said transmission is configured in such a manner that said state of said transmission is able to be changed from said power-transmission-state to a neutral state in which no power transmission path between said input shaft of said transmission and said output shaft of said transmission is provide, and
    said control means is configured so as to, in a case in which said condition of said shift operation member is changed from said condition for said forward driving or for said reverse driving to said condition in which said both-neutral-state is required, change said state of said transmission from said power-transmission-state to said neutral state after said changeover of said state-of-connecting of said clutch mechanism from said connection-state to said shut-off-state is completed.

4. A vehicular power transmission control apparatus according to claim 3, wherein said control means is configured so as to, from a timing at which said changing of said state-of-connecting of said clutch mechanism from said connection-state to said shut-off-state is completed, start changing said state of said transmission from said power-transmission-state to said neutral state.

5. A vehicular power transmission control apparatus according to claim 1, wherein said transmission is a multiple gear ratio transmission which does not comprise a torque converter and which can realize each of a plurality of predetermined reduction ratios different from one another as said transmission reduction ratio.

* * * * *